JOSEPH J. McCABE
INVENTOR

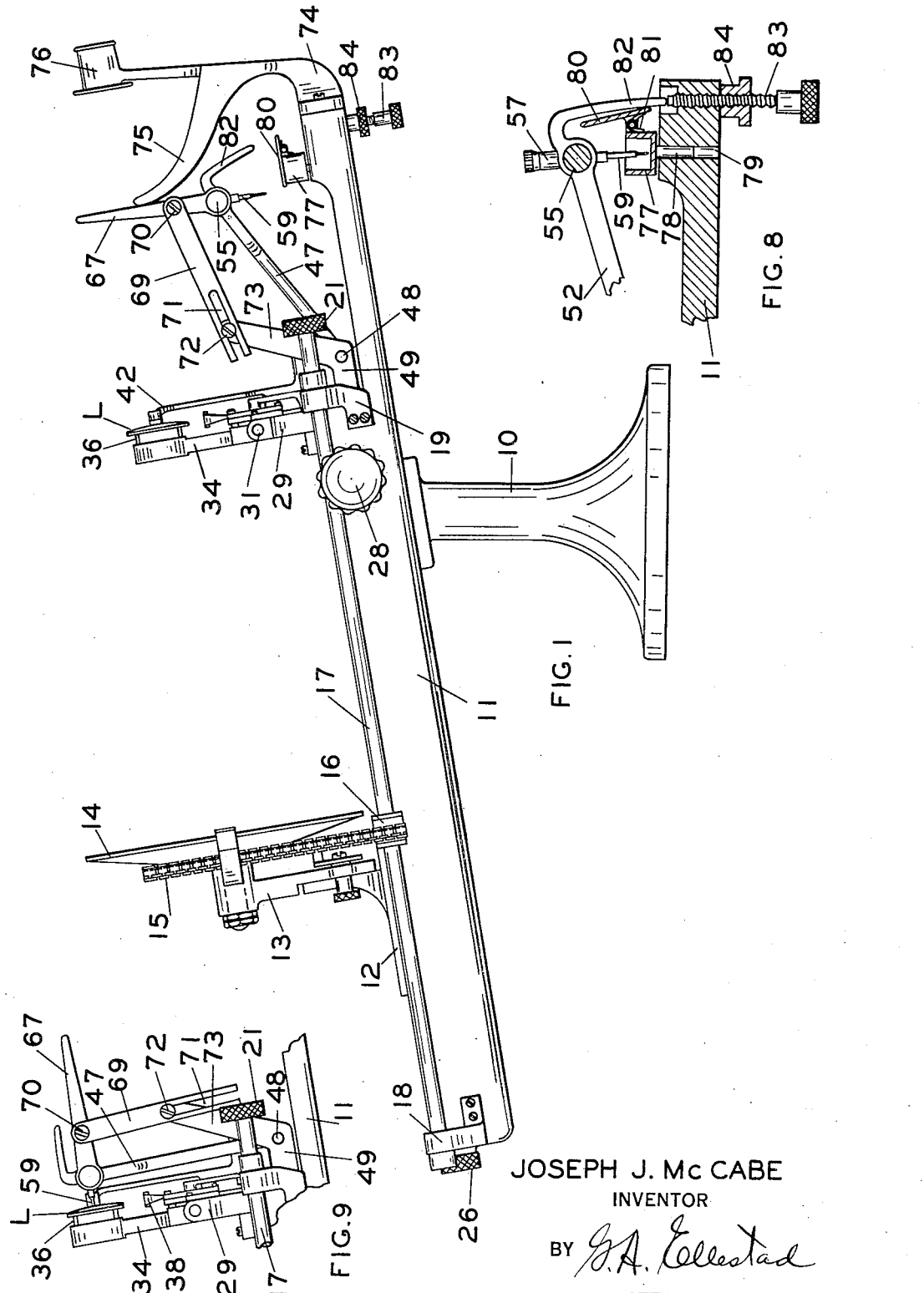

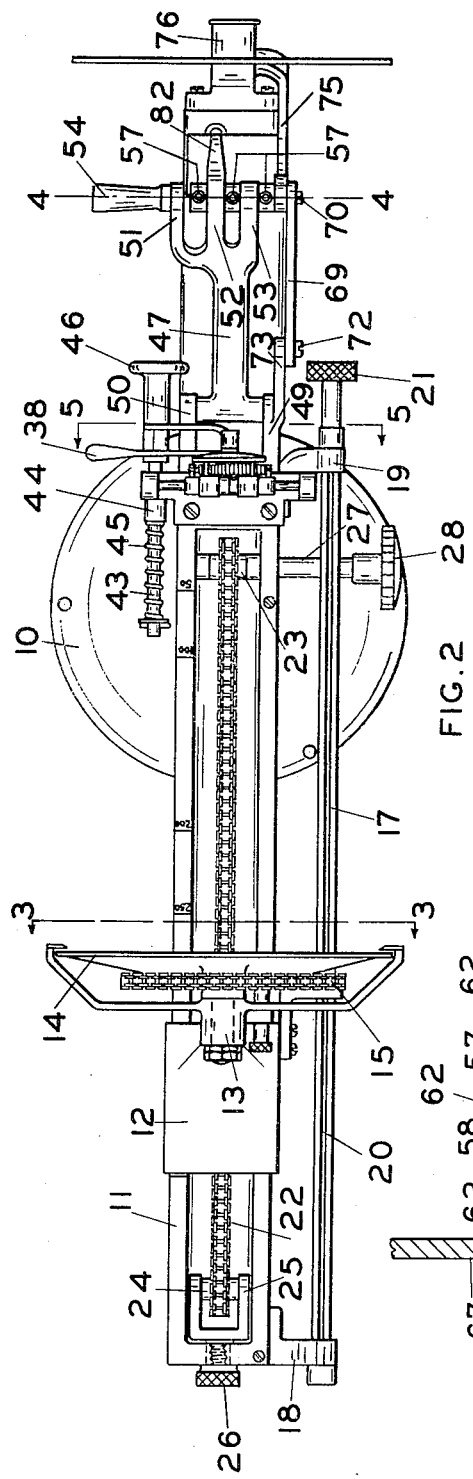
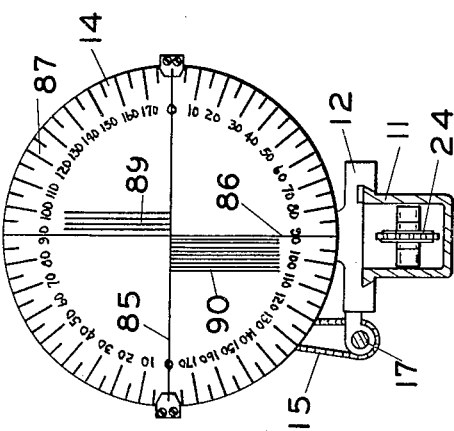
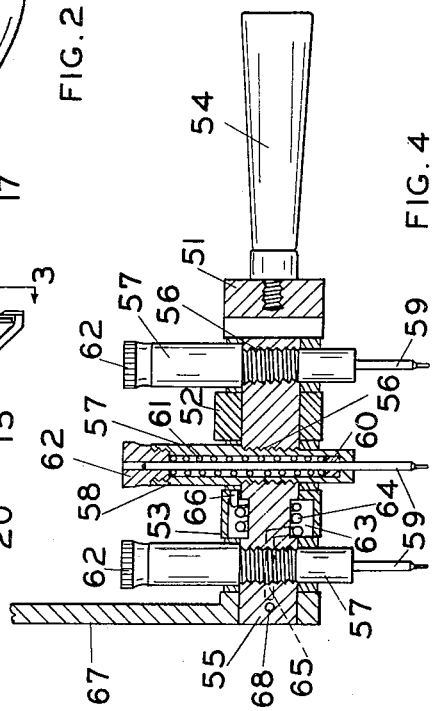
May 8, 1934.  J. J. McCABE  1,958,275
LENS TESTING INSTRUMENT
Filed April 2, 1931   3 Sheets-Sheet 2
JOSEPH J. McCABE
INVENTOR
BY G. A. Ellestad
ATTORNEY May 8, 1934.　　　　　J. J. McCABE　　　　　1,958,275
LENS TESTING INSTRUMENT
Filed April 2, 1931　　　3 Sheets-Sheet 3

BY *J. A. Ellestad*
ATTORNEY

Patented May 8, 1934

1,958,275

UNITED STATES PATENT OFFICE 1,958,275

LENS TESTING INSTRUMENT

Joseph J. McCabe, Rochester, N. Y., assignor to Bausch & Lomb Optical Company, Rochester, N. Y., a corporation of New York Application April 2, 1931, Serial No. 527,128

13 Claims. (Cl. 88—56)

This invention relates to optical apparatus and more particularly it has reference to devices which are employed for testing, centering and marking lenses.

One of the objects of my invention is to provide an improved device for testing and marking lenses which will be convenient and efficient in operation. Another object is to provide a device of the character described in which the lens marking pins are moved in a substantially straight, linear path when they are adjacent to lens which is to be marked. Still another object is to provide a lens testing and marking device having lens holding means for supporting lenses in a plurality of spaced planes and means to move the lens marking pins in a substantially straight path from one plane to another. A further object is to provide, in a device of the type described, an improved ink holder having a self closing cover and means for automatically opening the cover during operation of the marking pins. Another object is to provide improved lens holding means on a device of the type described. These and other objects and advantages reside in certain novel features of construction, arrangement and combination of parts as will hereinafter be more fully described and pointed out in the appended claims.

Referring to the drawings:

Fig. 1 shows a side elevation of a lens testing and marking device embodying my invention.

Fig. 2 is a top plan view of same.

Fig. 3 is a view taken on line 3—3 of Fig. 2.

Fig. 4 is a view taken on line 4—4 of Fig. 2 with parts in elevation.

Fig. 8 is a fragmentary view showing the inking position of the marking pins.

Fig. 9 shows the pins in position to mark a lens.

Similar reference characters refer to similar parts throughout the several views of the drawings.

Figure 6:
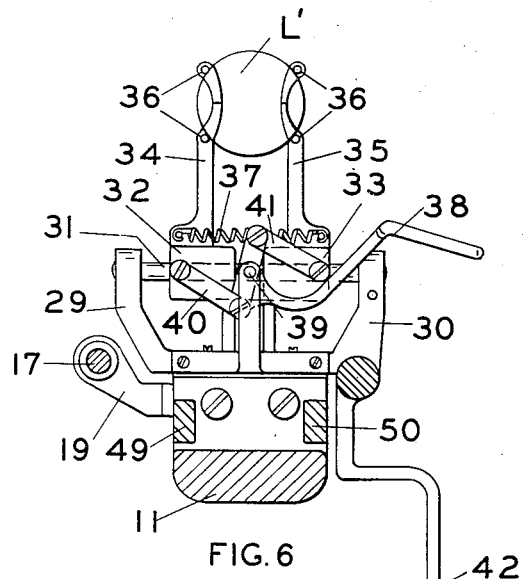
Fig. 6 is a similar view illustrating the use of the other lens holder.

A preferred embodiment of my invention is illustrated in the drawings wherein 10 indicates a base which supports a channeled bed or frame 11 on which is slidably mounted the carriage 12 provided with the bracket 13. Rotatably mounted on the bracket 13 is the target 14 fixedly carrying a gear wheel (not shown) which is connected, by a chain belt 15, to the pinion 16 mounted on shaft 17 which is journalled in bearings 18 and 19 carried by frame 11. The pinion 16 is splined to shaft 17 by means of the keyway 20 so that the target 14 can always be rotated by the finger piece 21 while still permitting the carriage 12 to be moved along the frame 11 to adjust the position of the target. Fixedly secured to the under side of carriage 12 are the two ends of a chain belt 22 which is trained over the gear wheels 23 and 24 which are rotatably mounted within the channel of frame 11. The wheel 24 is mounted in yoke 25 which can be adjusted by means of threaded nut 26 so as to vary the tension on chain belt 22. Fixed to wheel 23 is the shaft 27 having a knob 28 by means of which the wheel can be turned to adjust the position of the target 14 along the frame 11, as will be apparent to those skilled in the art.

Mounted on the frame 11 are the two brackets 29 and 30 which support a rod 31 on which two members 32 and 33 are slidably mounted. The two members 32 and 33 have, respectively, the extensions 34 and 35 provided with pins 36 which are adapted to hold a lens L' in position under the action of coil spring 37 which tends to move members 32 and 33 together. The members 32 and 33 may be moved apart, against the action of the spring 37, by means of a handle member 38 pivotally mounted at 39 and connected to the members 32 and 33 by the pivoted links 40 and 41, respectively. This type of lens holding means is especially adapted for holding cut lenses and its manner of use is clearly illustrated in Fig. 6.

Figure 5:
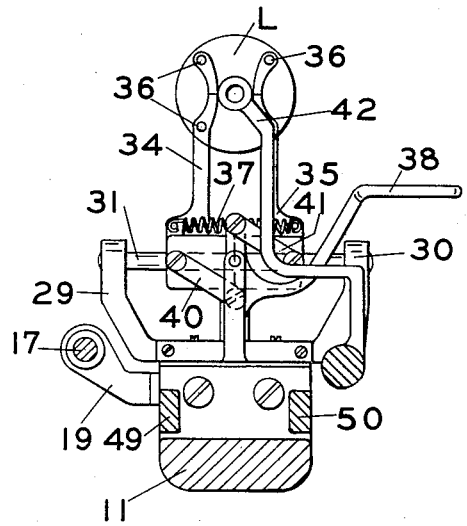
Fig. 5 is a view taken on line 5—5 of Fig. 2 showing the use of one lens holding device.

Another type of lens holder, which may be used conveniently for holding an uncut lens, is shown in use in Fig. 5. This holder comprises a finger 42 secured to a rod 43 which is slidably mounted in bracket 44 attached to frame 11, as clearly shown in Fig. 2. Surrounding the rod 43 is a coil spring 45 which tends to urge the finger 43 forward so as to hold lens L against the pins 36. A handle 46 attached to rod 43 serves as a convenient means for manipulating the finger 42 when inserting or withdrawing a lens. When the other lens holder is used, the spring pressed finger 42 may be turned to an inoperative position, as shown in Fig. 6.

The lens marking device, which will now be described, comprises a bracket 47 which is adapted to swing in an arcuate path and is pivotally mounted on shaft 48 held between the two brackets 49 and 50 mounted on frame 11. The bracket 47 terminates, at its free end, in three spaced, integral members 51, 52 and 53. A suitable handle 54, for moving the bracket, is secured to member 51 and a shaft 55 is rotatably mounted in members 52 and 53. The shaft 55 is provided with three apertures into each of which there is secured, by threads 56, a marking pin unit indicated generally at 57. The marking pin unit 57 comprises a tubular member 58 within which is slidably mounted the marking pin 59 having fixed thereto a shoulder member 60 against which the coil spring 61 bears. The coil spring 61 is retained in the tubular member 58 by a threaded nut 62. It will thus be apparent that the marking pin 59 is mounted for yieldable engagement with the lens during the marking operation.

The bearing member 53 is recessed as at 63 to provide room for the coil spring 64 which encircles the shaft 55. One end of the coil spring 64 is secured to the shaft 55 at 65 and the other end is secured at 66 to the bearing member 53. The coil spring is under tension so that it tends to turn shaft 55 in its bearings. A lever 67 is fixedly secured to shaft 55 by means of a pin 68. A link 69 has one end pivotally secured at 70 to the lever 67 while the other end of the link has an elongated slot 71 which has a sliding, pivoted engagement with a fixed pivot 72 mounted on bracket 73 fixed to frame 11. Attached to frame 11 is a support 74 having a forwardly extending fixed arm 75 with which the lever 67 contacts during the operation of inking the marking pins 59, as will hereinafter be described. The bracket 74 also carries the usual sight tube 76 as will be apparent to those skilled in the art.

An ink reservoir or holder 77 is detachably secured to frame 11 by means of a projecting pin 78, fixed thereto, which fits snugly into the hole 79 in frame 11. The ink holder has a hinged cover 80 which is normally kept closed by the action of coil spring 81. When the pins 59 are moved to inking position, the cover 80 is automatically opened by the finger 82 which projects from member 52 on bracket 47. A set screw 83 and lock nut 84 may be adjusted so as to limit the movement of the marking pins 59 into the ink holder, as shown in Fig. 8.

In operation of my device, a lens L may be held against the pins 36 by means of the spring pressed finger 42, as shown in Fig. 5; or it may be held by the hand against the pins 36. If the lens has been cut and edged it may be held, as shown at L' in Fig. 6, between the pins 36. The face of the target 14 is provided with suitable cross lines 85 and 86, the circular graduations 87 and the two series of spaced parallel lines 89 and 90 so that the optical center, cylinder axis and prism power of lenses may be determined in a manner well known to those skilled in the art. When the optical center or axis of a lens has been located it is linked or marked with the three spaced marking pins 59 by swinging the bracket 47 forward by means of handle 54.

In the general use of the device it will, of course, be required to test and mark lenses of varying thicknesses. Furthermore, the device must be capable of accurately marking a lens whether it be held on top of pins 36, as in Fig. 5, or between the pins, as in Fig. 6. In order to take care of these conditions it is necessary that the marking pins 59 move in a substantially straight line when assuming a marking position. In other words, when the marking pins are adjacent to the lens holders they should travel in a plane which is substantially parallel to frame 11 and includes the axis of the target. When this straight line travel of the marking pins is provided the axis and center will always be accurately and properly marked whether the lens be thick or thin or held on top of the pins 36 or between them.

Figure 7:
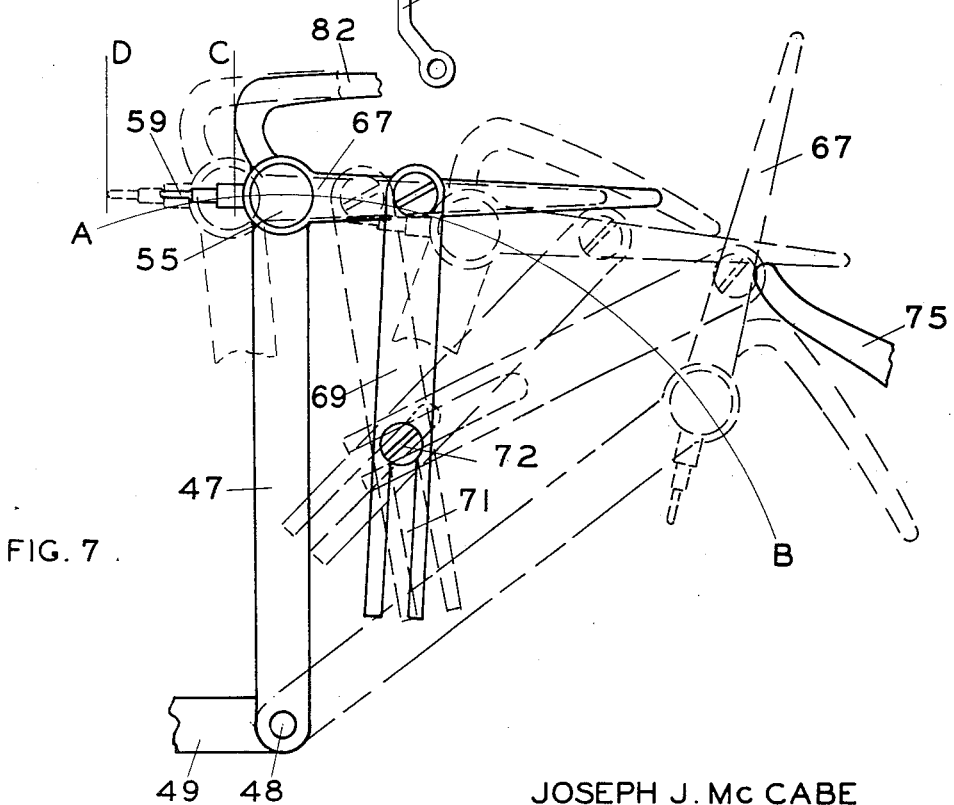
Fig. 7 is a schematic diagram illustrating the operation of the lens marking means.

The cycle of movement of the marking pins will be more fully understood by reference to the schematic diagram of Fig. 7. When bracket 47 is swung rearwardly and downwardly the lever 67 contacts with arm 75 so that the shaft 55 is turned against the action of coil spring 64 and the pins 59 are moved to a downwardly pointing position for inking, as shown in Fig. 8. As the bracket 47 is raised upwardly and forwardly the lever 67 rides off the cam arm 75 and the spring 64 turns shaft 55 so that the marking pins 59 gradually begin to approach a forwardly pointing horizontal position. During this movement of bracket 47 the slot of link 69 slides along and turns about the fixed pivot 72 until the bottom of the slot 71 contacts with pivot 72 just before the bracket 47 assumes a vertical position. Then the link no longer slides on pivot 72 and a continued forward movement of bracket 47 causes the shaft 55 to turn clockwise so the pins 59 move in a substantially straight line despite the fact that the bracket 47 always moves in an arcuate path indicated at AB in Fig. 7. The straight line travel of pins 59 begins when they reach line C and before the bracket 47 reaches the vertical position and this linear movement of the pins 59 continues until they reach line D. In one embodiment of my invention this range of straight line travel is over an inch in length so that it amply takes care of all differences in lens thickness and permits the use of either type of lens holder.

From the foregoing it will be apparent that I am able to provide a convenient and efficient device of the character described embodying improved means for testing and marking lenses. Various modifications can obviously be made without departing from the spirit of my invention as pointed out in the appended claims.

I claim:

1. A lens testing and marking device having in combination a frame, a bracket pivotally mounted on said frame to move in an arcuate path, a shaft mounted to turn on said bracket, marking pins secured to said shaft, and linkage means for moving said marking pins during the movement of said bracket in a plane which is substantially tangent to the arcuate path of said shaft.

2. In a lens testing and marking device, the combination of a frame, lens holding means mounted on said frame, a bracket pivoted on said frame to move in an arcuate path, said bracket having its pivot at a point which is spaced from the vertical plane of said lens holding means, lens marking means movably mounted to turn about a horizontal axis on said bracket and linkage means pivoted to said frame for moving said marking means in a plane which is substantially tangent to the arcuate path of said bracket.

3. A device of the character described comprising a frame, lens holding means mounted on said frame, target means carried by said frame, a bracket mounted to turn about an axis on said frame, marking means mounted to turn on said bracket, and controlling means for controlling the turning of said marking means said controlling means comprising pivoted lever means connecting said marking device and said frame.

4. A lens testing and marking device comprising a frame, lens holding means carried by said frame for holding a lens to be tested, target means mounted on said frame, a bracket pivotally mounted on said frame, lens marking means mounted to turn about an axis on said bracket, controlling means for determining the movement of said marking means, said controlling means comprising a lever having one end pivotally connected to said marking means, the other end of said lever having a sliding pivotal connection with said frame.

5. A lens testing and marking device having in combination a frame, lens holding means mounted on said frame for supporting lenses in a plurality of spaced planes, lens marking means swingably mounted on said frame and mechanism for moving said marking means in a substantially straight path from one of said planes to another, said mechanism comprising a link pivotally connecting said marking means and said frame.

6. In a lens testing and marking device, the combination of a frame, lens marking means movably mounted on said frame, an ink holder carried by said frame, said holder having a movable cover, means for normally holding said cover in closed position and means carried by said marking means for moving said cover to open position.

7. A lens testing and marking device comprising a frame, a target carried by said frame, lens holding means mounted on the frame, a bracket pivotally mounted on said frame to move in an arcuate path, lens marking means movably mounted on the free end of said bracket and means for moving said marking means in a substantially straight, linear path during a portion of the arcuate movement of said bracket.

8. In a device of the character described the combination of a frame, an ink holder mounted on said frame, a lens marking device pivotally mounted on said frame, said device comprising a plurality of pins, means for moving said pins into said ink holder and adjustable stop means comprising a screw carried by said frame for limiting the movement of said pins into said holder.

9. A lens testing and marking device comprising a frame having a target movably mounted thereon, lens holding means carried by said frame, a bracket pivotally mounted on said frame, a shaft movably mounted on said bracket, a coil spring tending to turn said shaft, marking pins fixed to said shaft, an arm carried by said frame, a lever fixed to said shaft, said lever having a surface adapted to contact with said arm, a link having one end pivoted to said lever, the other end of said link having a sliding pivotal connection with said frame.

10. In a lens testing and marking machine, the combination of a frame, a bracket pivotally mounted on said frame to move in an arcuate path, marking means movably mounted on said bracket, and means for moving said marking means in a substantially straight path during a portion of the arcuate movement of said bracket, said means comprising a link having one end pivotally connected to said marking means, the other end of said link having a slot which receives a pivot member fixed to said frame.

11. In a lens testing and marking machine, the combination of a frame, a bracket movably mounted on said frame, a movably mounted shaft carried by said bracket, marking pins carried by said shaft, a coil spring tending to turn said shaft, a lever fixed to said shaft, an arm carried by said frame, said lever being positioned to contact with said arm during a portion of the movement of said bracket whereby said shaft is turned against the action of said spring.

12. A lens testing and marking device comprising a frame, a target mounted on said frame, lens holding means carried by said frame, a bracket pivotally mounted on the frame to turn in an arcuate path, a shaft mounted to turn on said bracket, a coil spring tending to turn said shaft, marking pins carried by said shaft, a lever secured to the shaft, an arm mounted on said frame, an ink holder carried by the frame, said holder having a normally closed cover, a finger on said bracket for opening said cover upon movement of the bracket, said lever being positioned to contact with said arm to turn said shaft during part of the movement of said bracket and means for controlling the movement of said shaft during another part of the movement of the bracket, said means comprising a link having one end pivotally connected to said lever, the other end of said link having a slot which is slidably mounted on a pivot pin carried by said frame.

13. In a device of the type described the combination of a frame, a bracket mounted to swing on said frame, marking pins carried on the free end of said bracket, an ink reservoir mounted on the frame in the arcuate path of the marking pins, a cover normally closing said reservoir, a finger mounted on said bracket and adapted to contact with said cover to open the reservoir to the marking pins, and an adjustable stop carried by said frame, said finger being adapted to contact with said stop to limit the movement of said pins into said reservoir.

JOSEPH J. McCABE.